April 21, 1953     A. FISCHBACH ET AL     2,636,060

PRIMARY BATTERY AND METHOD OF MAKING THE SAME

Filed May 3, 1950

*INVENTORS.*
ADOLPH FISCHBACH
HYMAN J. MANDEL
BY
*Harry M. Saragovitz*
Attorney

Patented Apr. 21, 1953

2,636,060

UNITED STATES PATENT OFFICE 2,636,060

PRIMARY BATTERY AND METHOD OF MAKING THE SAME

Adolph Fischbach, Loch Arbour, and Hyman J. Mandel, Red Bank, N. J., assignors to the United States of America as represented by the Secretary of the Army Application May 3, 1950, Serial No. 159,806

10 Claims. (Cl. 136—100)

(Granted under Title 35, U. S. Code (1952), sec. 266)

The invention described herein may be manufactured and used by or for the Government for governmental purposes, without the payment of any royalty thereon.

This invention relates to primary cells, of the deferred action type, using the electro-chemical system magnesium-water-cuprous chloride.

Magnesium-cuprous chloride batteries have attained considerable importance, particularly as "meteorological" or "one-shot" batteries, due to their high capacity per unit of weight and volume, their excellent operating characteristics even at low temperatures (linear potential and capacity), their ease of activation with water as electrolyte and their low cost of manufacture. Since neither acid nor alkaline electrolytes are used in these batteries, the danger of corrosion, cause particuly by acid fumes, is completely eliminated.

In the past, cuprous chloride electrodes were made from fused cuprous chloride. In manufacturing such cuprous chloride electrodes a supporting structure, for instance, a coil or a wire grid, was placed in a mold and the latter supplied with the requisite amount of fused cuprous chloride poured from a heated crucible. It has also been known to dip a screen wire base into a fused mass of cuprous chloride in order to produce an adherent film on the screen. Fused cuprous chloride involves a number of severe production difficulties, particularly in mass production, due to the necessity of maintaining the cuprous chloride at relatively high temperatures while charging the supporting grids or plates with the fused cuprous chloride. In addition to these production difficulties, the active area of a fused cuprous chloride electrode is limited substantially to the outer surface exposed to the electrolyte while the interior parts of the fused cuprous chloride remain mostly inactive.

It is an object of this invention to produce a cuprous chloride electrode which is of a porous or spongy character. A further object is to facilitate manufacturing methods and to obviate the necessity of heating the cuprous chloride to the fused condition.

Briefly stated, the above-mentioned and other objects are attained by using, for the manufacture of the cuprous chloride electrodes, a pasty mixture comprising essentially finely ground cuprous chloride and a liquid, essentially water. The cuprous chloride is not brought into the fused condition, and heat, if any, is applied only to accelerate the drying process. The resulting cuprous chloride electrode is of porous, spongy character.

The following description and accompanying drawing, taken in connection with the appended claims, represent specific embodiments of the inventive idea.

Figure 1:
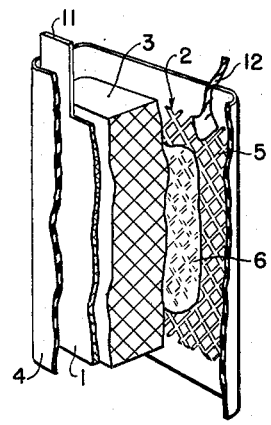
Figure 1 is a perspective view of a single cell according to the invention partly cut away to show the internal elements and their construction.

The single cell of Fig. 1 comprises a positive magnesium electrode 1 and a negative cuprous chloride electrode 2. A spacer 3 consisting, in conventional manner, of any suitable, bibulous and ionically conducting material separates the magnesium electrode 1 from the cuprous chloride electrode 2. A hull 4 of insulating sheet material holds the elements of the electrode-spacer structure laterally together under pressure contact but leaves top and bottom of the electrode-spacer structure open.

The cuprous chloride electrode is produced by first making a pasty mixture of cuprous chloride and water, preferably in the ratio of 100 grams of cuprous chloride to 30 grams of water.

The mixture is then pasted on a supporting grid 5, which may consist of a wire screen of copper, bronze, lead, stainless steel or any other suitable conductive support of a material which does not appreciably affect the characteristics of the system. Fig. 1 shows a partially finished cuprous chloride electrode consisting of the supporting wire screen 5 with the cuprous chloride pasted only in the center of the screen. Very thin cuprous chloride electrodes may be produced by using, for instance, a 45/45 mesh copper screen of about .015" thickness.

To improve the conductivity of the cuprous chloride, various inert conductive materials may be added to the pasty mixture, such as carbon black or graphite. Particularly suitable are the substances known under the trade names of "Dixon Graphite" and "Shawinigan Black." Such materials are preferably added in amounts of about 1 to 2% of the cuprous chloride.

After pasting the cuprous chloride mixture on the wire screen 5, the electrodes may be air-dried at room temperature; they could also be dried at elevated temperatures.

The magnesium electrode 1 is preferably of about .006"–0.014" in thickness. Either pure magnesium or some alloy may be used and neither should contain more than about 1% of impurities.

Spacer 3 may consist of paper, wood pulp, micro porous rubber, glass-wool, rayon (viscose) felt, or other liquid retaining materials, inert to the action of the substances produced during the electro-chemical actions of the cell. The thickness of the spacer 3 is designed to soak up enough electrolyte (not shown) to allow complete utilization of the active materials of the electrodes 1 and 2.

The electrodes 1 and 2 are provided with respective terminals 11 and 12. The terminal 12 of the cuprous chloride electrode 2 may consist of one or more screen wires extending from the electrode area and twisted into a single terminal.

The cell may be simply assembled by arranging the negative and positive electrodes 1 and 2 at opposite sides of the separator 3 and then winding insulating sheet material peripherally around the electrode-spacer structure so as to obtain a hull 4 which leaves top and bottom of the electrode spacer structure open. The insulated sheet material of the hull 4 may consist of polystyrene sheet material, pressure sensitive cellulosic tape (for instance, Scotch tape), or sheets from various other polyvinyl resins, or the like.

The assembled cell is activated by immersing the same in water which may contain small amounts of hydrochloric acid or sodium chloride or other ionizable substances which tend to favorably alter the operating characteristics of the battery. The addition of sodium chloride or other suitable chlorides to the electrolyte results in a somewhat greater cell voltage and also brings the voltage up more rapidly, than water alone.

It is usually sufficient to keep the cell immersed in the electrolyte for about one-half to one minute depending on the size of the cell and the porosity of the spacer 3. Usually, it is sufficient to immerse "dunk" only half of the height of the cell into the liquid electrolyte. After the spacer 3 has absorbed sufficient electrolyte, the cell is withdrawn, shaken to remove excess electrolyte and is then ready for use.

Figure 2:
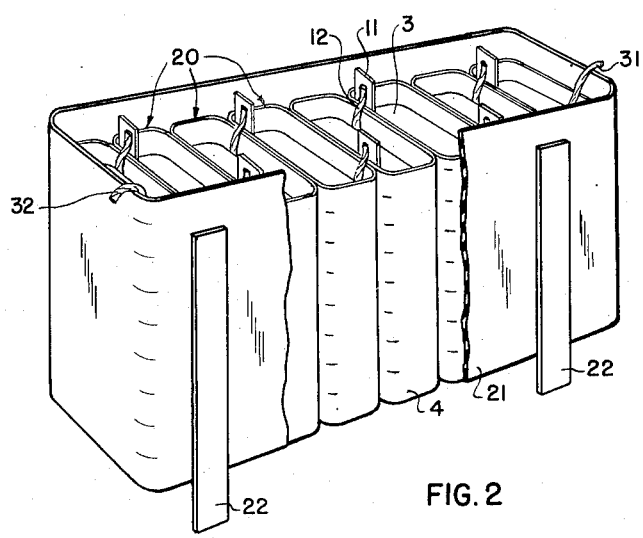
Figure 2 is a perspective view of a meteorological battery made up of a plurality of such cells, the outer wrapping of the battery being partly broken away.

Figure 2 shows a meteorological "dunk" type battery consisting of a plurality of cells of the type shown in Figure 1. An outer wrapping 21 (consisting of the same materials as the hull 4) holds the cells 20 together under pressure contact, leaving the tops and bottoms of the cells free for the entrance of the electrolyte which is soaked up by the spacers 3 of the cells 20. The electrode terminals 11 and 12 of each cell stand up at the top, and the cells 20 are connected in series, in well known manner, by soldering or welding together the positive terminals 11 of each cell to the negative terminal 12 of each adjacent cell, leaving the positive terminal 32 of one end cell and the negative terminal 31 of the other end cell free for their use as battery terminals.

Supporting strips 22, which extend below the outer wrapper 21, serve as legs to hold the battery in a raised position.

While we have described our invention in connection with the design of a deferred action type battery, we do not wish to be limited either to the particular design or to the specific combination of internal elements referred to herein, since it is evident that the cuprous chloride electrode according to our invention may be used in various other battery designs and also in combination with other elements in other electro-chemical systems.

We claim:

1. A cuprous chloride electrode for primary cells comprising a thin grid supporting a porous, spongy mass of cuprous chloride.

2. An electrode according to claim 1 wherein said spongy mass of cuprous chloride contains finely ground, inert, conductive material.

3. An electrode according to claim 1 wherein said spongy mass of cuprous chloride contains finely ground graphite.

4. An electrode according to claim 1 wherein said spongy mass of cuprous chloride contains finely ground carbon black.

5. A cuprous chloride electrode for primary cells comprising a thin grid supporting a dried paste of finely ground cuprous chloride and water.

6. A cuprous chloride electrode for primary cells comprising a thin grid and a dried paste of finely ground cuprous chloride, water and an inert conductive material.

7. A cuprous chloride electrode for primary cells comprising a thin grid and a dried paste of finely ground cuprous chloride, water and finely ground graphite.

8. A cuprous chloride electrode for primary cells comprising a thin grid and a dried paste of finely ground cuprous chloride, water and finely ground carbon black.

9. A deferred action primary cell having thin, sheet-form, internal elements arranged in close proximity to one another, said elements comprising a magnesium electrode, a spacer of bibulous, ionically conductive material and a cuprous chloride electrode, said cuprous chloride electrode comprising a thin grid supporting a porous, spongy mass of cuprous chloride.

10. A deferred action type, primary battery using the system magnesium-cuprous chloride comprising juxtaposed electrically connected cells, said cells each comprising as internal elements a magnesium electrode, a spacer of bibulous, ionically conductive material, and a cuprous chloride electrode, said cuprous electrode comprising a thin grid supporting a porous, spongy mass of cuprous chloride.

ADOLPH FISCHBACH.
HYMAN J. MANDEL.

References Cited in the file of this patent

UNITED STATES PATENTS

| Number | Name | Date |
| --- | --- | --- |
| 2,322,210 | Adams | June 22, 1943 |

FOREIGN PATENTS

| Number | Country | Date |
| --- | --- | --- |
| 443,983 | Great Britain | Mar. 11, 1936 |